United States Patent Office 3,461,780
Patented Aug. 19, 1969

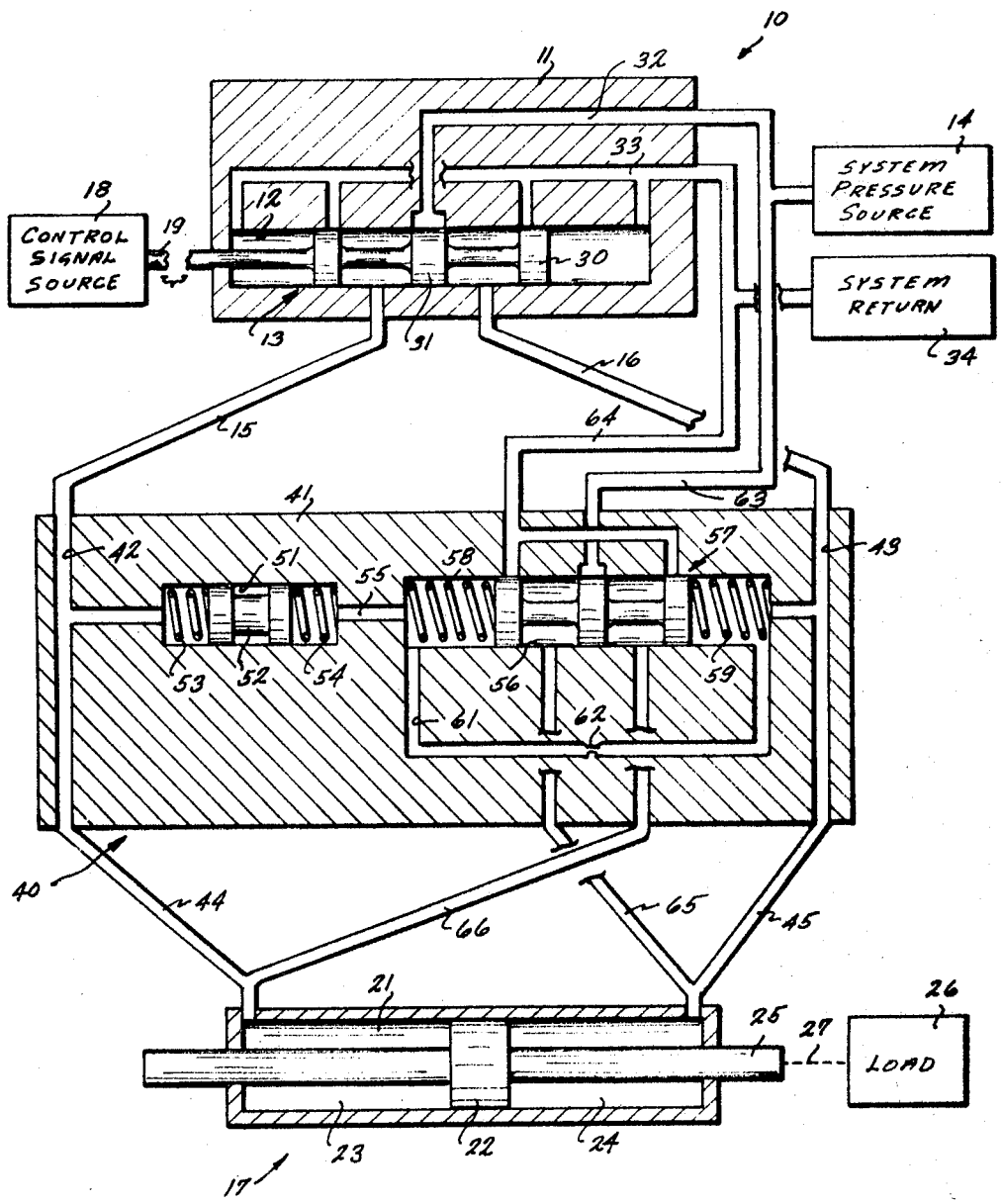

3,461,780
DYNAMIC LOAD DAMPING VALVE FOR CONNECTING SYSTEM PRESSURE FLUID AND RETURN TO ACTUATOR
Franz Schmon, Granada Hills, Calif., assignor to Bell Aerospace Corporation, a corporation of Delaware
Filed Sept. 7, 1967, Ser. No. 666,086
Int. Cl. F15b 11/10, 13/042; F16d 57/00
U.S. Cl. 91—433                           2 Claims

ABSTRACT OF THE DISCLOSURE

Disclosed is apparatus for controlling the application of fluid under pressure to an actuator which comprises a cylinder having a movable piston therein thus separating the cylinder into a pair of chambers. The fluid pressure is applied in response to a control signal which positions a control valve to one or the other of the chambers thereby positioning the actuator, and responsive thereto a load, in accordance with the information provided by a control signal. Connected across the piston and thereby the two chambers of the actuator, is a dynamic load damping apparatus in accordance with the present invention. Such apparatus includes first and second spring centered spool valves one of which is connected to one of the chambers and the other to the other of the chambers. A restriction orifice is connected across the second of the spool valves and in such a manner as to communicate with the opposite end of the first spool valve. Thus, as a pressure difference exists across the two chambers of the actuator, a pressure differential signal is generated across the second of the spool valves, the first of the spool valves operating as an isolation valve, thus, causing the second of the spool valves to move in response to the differential pressure signal. If the signal is a steady state signal then the pressure difference across the second of the spool valves is bled off or equalized through the restriction orifice. As the second spool valve moves in response to the pressure differential signal thereacross, fluid under pressure is applied to the chamber of the actuator which has the lower pressure therein while the higher pressure chamber of the actuator is connected to system return.

Background of the invention

The use of control valves for positioning hydraulic actuators which are in turn further used for controlling various apparatus is well known in the art and in many instances such hydraulic actuators are utilized to control loads which are extremely heavy and have a large inertia and may be subject to relatively large friction components. Under certain operating conditions, these loads have a resonant frequency which is within or very near the band pass of the hydraulic actuating system. Means therefore must be taken to damp these oscillations, particularly those areas wherein the frequency of application of power to the load is near or approaches the resonant frequency of the load.

Various control systems have been developed in the prior art to accomplish the damping as desired. For example, such valves as those illustrated in Patent Nos. 3,042,005 and 3,064,627 have been utilized to apply a pressure feedback signal to the control valve from the actuator. Furthermore, such devices as that shown in Patent No. 3,138,072 have also been developed to bypass an actuator in response to dynamic load-pressure signals developed across the actuator. Although these various valves have operated quite effectively under the desired conditions for which they were originally designed, it has been found that in many instances, a more effective and faster operating dynamic load damping apparatus is desirable.

Accordingly, it is an object of the present invention to provide a dynamic load damper which is rugged, simple, and inexpensive to manufacture.

It is another object of the present invention to provide a dynamic load damper which has increased damping characteristics as compared to prior art dynamic load damping devices.

It is a further object of the present invention to provide a dynamic load damping device which is usable separate and apart from the control valve and which is relatively simple to calibrate and maintain and which is highly reliable as compared to prior art systems.

Dynamic load damping apparatus in accordance with the present invention includes means connected across the chambers of the actuator for detecting the dynamic pressure differential therebetween. Valve means is operatively interconnected to the means for detecting and is responsive to the pressure differential detected to connect that chamber experiencing the higher load pressure to system return and the other chamber to system pressure fluid.

Brief description of the drawings

Additional objects and advantages of the present invention will become apparent from a consideration of the following description taken in conjunction with the accompanying drawing which is presented by way of example only and is not intended as a limitation upon the scope of the present invention as defined in the appended claims, and in which:

The single figure illustrates schematically a hydraulic control device embodying a dynamic load damper in accordance with the present invention.

As is schematically illustrated in the drawing there is provided a control valve 10 having a body 11 which defines the bore 12 having a spool valve 13 slidably disposed therein. Movement of the spool valve 13 controls the flow of fluid under pressure from a system fluid source 14 through passageways 15 and 16 to an actuator 17. Movement of the spool valve 13 within the bore 12 is controlled by signals emanating from a control signal source 18 which is shown connected by way of a rod 19 to the left side of the spool valve 13. Although the control signal source 18 is shown mechanically connected to the spool valve 13, this is not to be taken by way of a limitation but rather by way of example only. It should be expressly understood that the control signal source may be of an electrical-hydraulic nature or the like such as devices as indicated by Patents No. 2,947,286 and No. 3,233,623.

The actuator 17 includes a cylinder 21 separated by a piston 22 into a first chamber 23 and a second chamber 24. A rod 25 is connected to a load 26 as indicated by the dashed lines 27. The piston 22 is caused to move within the cylinder 21 by movement of the spool valve 13 in response to the signals from the source thereof 18. For example, should the control signal source 18 command the spool valve 13 to move toward the right as viewed in the drawing, the land 31 on the spool valve 13 moves toward the right thus connecting the passageway 32 leading from the pressure source 14 to the passageway 15 thus causing fluid under pressure to flow into the chamber 23. At the same time, land 30 is caused to move toward the right thus connecting chamber 24 to passageway 16 to passageway 33 and system return 34. Movement toward the left of the spool valve 13 causes a similar operation which will not be described in further detail herein since such is well known in the prior art.

The dynamic load damper in accordance with the present invention is also illustrated in the single figure of the drawing at 40 and includes a body 41 having passageways 42 and 43 to communicate respectively with conduits 44 and 45 for applying hydraulic power to the load actuating device 17 as above described. A bore 51 is provided within the body 41 and in communication with the passageway 42. Positioned within the bore 51 is a spool valve 52 which is positioned under static or quiescent centered conditions by springs 53 and 54 which are connected between the ends of the spool valve 52 and the respective ends of the bore 51. A passageway 55 communicates between the bore 51 and an additional bore 56. Housed within the additional bore 56 is a second spool valve 57 which is also maintained in a static or quiescent centered condition by springs 58 and 59 which are interconnected between the ends of the spool valve and the respective ends of the bore 56. The bore 56 also communicates with the passageway 43 communicating between the passageway 16 from the control valve and the passageway 45 leading to the load actuator 17.

Connected around the spool valve 57 and communicating with the bore 56 at longitudinally spaced portions thereof is a passageway 61 which defines a restriction orifice 62 therein. It should be noted that the passageway 61 communicates with the bore 56 on opposite sides of the spool valve 57. The function of the restriction orifice will be described more fully hereafter.

Also communicating with the bore 56 is a passageway 63 which is connected from a port at the bore 56 to the system pressure source 14. A passageway 64 is connected from the system return 34 to spaced apart ports on bore 56. The various ports thus far described as being defined by the bore 56 are opened or closed by translation of the spool valve 57 thereby connecting system pressure or return to the volumes bounded by the center and outer lands on the spool valve. A passageway 65 is also connected from a port between the center and left lands of the spool 57 and a port defined by the bore 56 to the chamber 24 of the actuator 17 while a passageway 66 is connected from another port between the center and right lands of the spool 57 and defined by the bore 56 to the chamber 23 of the actuator 17. Therefore, as the spool 57 translates, pressure or return is connected to chambers 23 or 24.

In the event of a pressure differential between the chambers 23 and 24 of the actuator 17, such will be sensed by the apparatus 40 in such a manner that the spool valve 57 translates to connect the chamber having the higher pressure therein to system return 34 and the chamber having the lower pressure therein to the system pressure source 14. In such a manner the actuator 17 and thus the load 26 is stabilized and becomes less sensitive to dynamic pressure changes appearing at the actuator 17 irrespective of their source.

In operation, should the pressure appearing in chamber 23 exceed that appearing in chamber 24, a pressure differential thereby exists. Under these circumstances the higher pressure appearing in chamber 23 is, through the passageways 44 and 42, applied to the left side of the spool valve 52. The lower pressure appearing in chamber 24 is applied through the passageways 45 and 43 to the right side of spool valve 57. The higher pressure causes the spool valve 52 to move toward the right as viewed in the figure thus attempting to compress the fluid appearing in the right side of the bore 51 and thereby applying an increased pressure signal to the chamber at the left side of the spool valve 57. This increased pressure signal is developed because of the restriction orifice 62 appearing in the passageway 61. That is, the restriction orifice 62 acts essentially as a differentiating mechanism causing a sudden pressure buildup to appear at the left side of the spool valve 57. This pressure buildup as well as the decreased pressure appearing at the right side of the spool valve 57 causes the spool valve 57 to translate toward the right as shown in the drawing. Such translation connects the system pressure source 14 through the passageway 63, the volume between the center and left lands of spool 57, and the passageway 65, to the chamber 24, being the chamber having the lower pressure herein. Simultaneously, the chamber 23 is connected through the passageway conduit 66, the volume between the center and right-lands of spool 57, and the conduit 64 to system return 34, chamber 23 having the higher pressure signal appearing therein. Within a predetermined period of time, depending upon the sizing of the restriction orifice 62, after the application of the pressure differential signal, the pressure appearing at each end of the spool valve 57 equalizes thus causing the springs 58 and 59 to return the spool valve 57 to its quiescent or centered position, as shown, wherein the pressure and return are disconnected from the actuator 17 except as such signals may be applied from the control valve 10.

In the event that the pressure differential is generated in such a manner as to cause the pressure appearing in the chamber 24 to be greater than that appearing in the chamber 23, the reverse sequence of operations from that above described will occur. That is, the increased pressure appearing in the chamber 24 is applied by way of passageways 45 and 43 directly to the right side of the spool valve 57, the rate of pressure signal buildup applied to the spool 57 being determined by the operation of the restriction orifice 62 in a differentiating fashion as above indicated. Under these circumstances, the spool valve 57 translates toward the left interconnecting the system pressure source 14 through the conduit passageway 63 and the passageway 66 to the chamber 23. Simultaneously, the chamber 24 is connected through the passageway 65 and passageway 64 to system return 34. Again, the pressure signal buildup generated by the restriction orifice 62 equalizes so that the springs 58 and 59 return the spool valve 57 to its quiescent centered position as shown in the drawing, after a predetermined period of time has elapsed.

It can therefore be seen that a control damping spool valve is conducted between the system pressure source and system return on one hand, and the load actuator working chambers on the other. The positioning of the control damping spool valve is effected as a result of differential load pressure signals appearing across the actuator, that is, across the working chambers thereof. The damping spool valve is thus positioned in response to the dynamic pressure signal of a differential nature appearing thereacross in the working chambers for a period of time sufficient to connect the source of system pressure and system return to the working chambers having the lower and higher pressure signals respectively appearing therein so as to preclude or damp movement of the load in response to the pressure differential appearing therein. It should also be seen that in the event the pressure differential is generated from command signals being applied to the actuator, the acceleration of the actuator is limited by operation of the damping spool valve 57.

There has thus been disclosed a dynamic load damper apparatus which operates in response to pressure differential signals in an actuator to damp actuator movement. The detailed disclosure in a schematic form of the particular configuration of the present invention is not to be taken as a limitation upon the scope of the invention as defined in the claims appended hereto:

What is claimed is:

1. Dynamic load damping apparatus for use with a hydraulic actuator having first and second working chambers separated by a piston and connected through control valve means variously to system pressure fluid and system return to position a load connected to said actuator in response to command signals, said apparatus being responsive to dynamic loads applied to said actuator whereby a pressure differential across said piston is generated, said apparatus comprising:

a damping valve means including a spool slidably disposed within a cylinder, said cylinder being interconnected between system pressure fluid and system return and said first and second end chambers in parallel with said control valve means, said spool having first and second end areas;

means connecting said first and second chambers to said first and second end areas respectively; passageway means including a restriction orifice interconnecting said first and second end areas, whereby a high pressure in said first chamber causes an increased pressure at said first end area thereby moving said spool and venting system pressure fluid to said second chamber and system return to said first chamber through said cylinder.

2. A dynamic load damper as defined in claim 1, in which said first named means further included an isolation spool valve connected at one side to one of said first and second chambers, the other of said chambers being connected to one of said end areas, and passageway means interconnecting said other end area with the other side of said isolation spool.

References Cited
UNITED STATES PATENTS 3,176,591   4/1965   Howland _____ 91—433

EDGAR W. GEOGHEGAN, Primary Examiner

U.S. Cl. X.R.

91—451; 188—97